Aug. 11, 1964  H. T. STULBERG ETAL  3,144,033
WASHER FOR WASTE PAPER STOCK
Filed Nov. 13, 1962
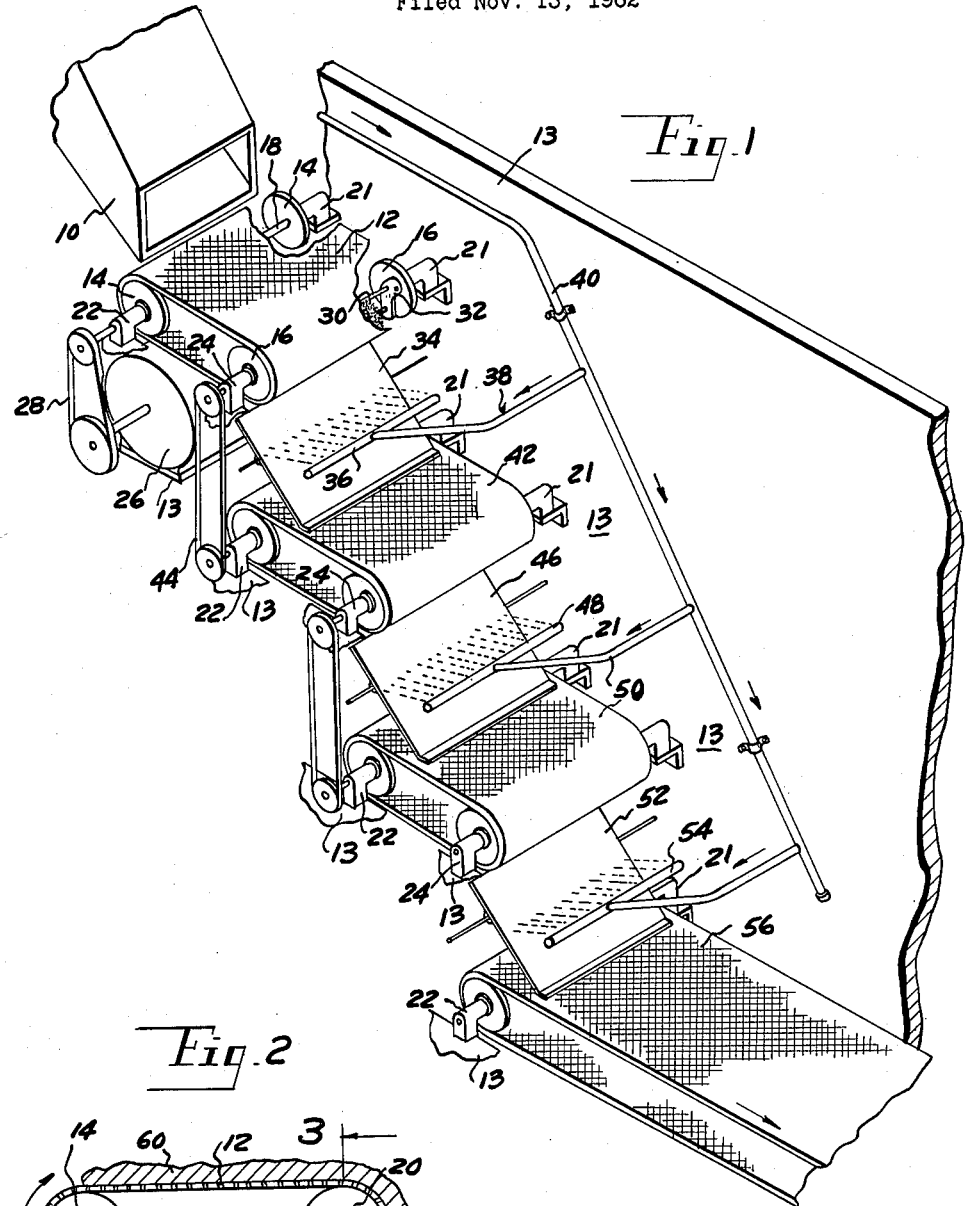
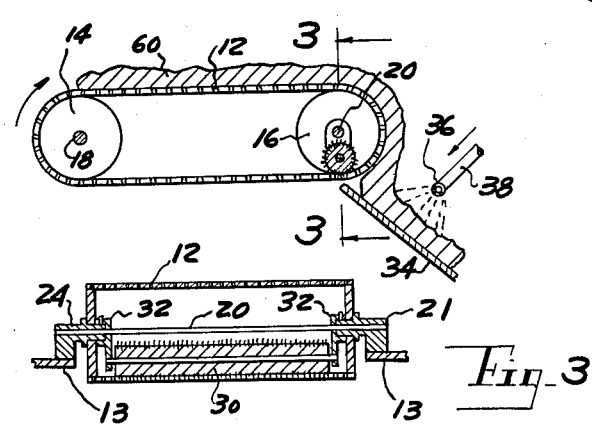
INVENTORS.
JAMES T. SLEVIN
HAROLD T. STULBERG.
BY Allen M. Kass
ATTORNEY

United States Patent Office 3,144,033
Patented Aug. 11, 1964

3,144,033
WASHER FOR WASTE PAPER STOCK
Harold T. Stulberg, 17503 Prairie, and James T. Slevin, 14609 Tracey, both of Detroit, Mich.
Filed Nov. 13, 1962, Ser. No. 237,167
7 Claims. (Cl. 134—104)

This invention relates to a washer useful for removing ink and foreign particles from the cellulose stock which is the output of a device such as a beater operating on waste paper.

In the preparation of cellulose pulp from waste paper or rags the raw material is normally first processed in a mechanical beater wherein force is applied to the stock in the presence of water and detergents so as to cause the cellulose fibers to be separated from one another and from the ink and other contaminants present in the raw material. The output of this beater constitutes a suspension of the cellulose fibers, ink and foreign particles in a base of water and detergent.

It is the primary object of the present invention to provide a washer which is capable of receiving such a suspension and removing the ink and foreign particles and cleaning the remaining cellulose fibers.

The washer of the present invention broadly takes the form of a plurality of horizontal belts of fine screen material disposed end to end with successive belts occupying successively lower elevations in the form of a staircase. The mesh of the screen used in the belts is such as to prevent cellulose fibers of any reasonable length from passing through with the fluid, while allowing ink and foreign particles to pass through.

The adjacent ends of the belts are connected to one another by inclined plates. The fibers are subjected to a pressured water spray as they move down the inclined plates under the force of gravity. The repeated water washing dilutes the suspension base to a degree of purification that is a function of the number of stages employed, the speed of the material and the length of the system. The physical force that the fibers are subjected to between the water jets and the inclined plates assists in physically separating the fibers from the contaminants.

The inclinations of the plates and the speed of the belts are correlated so that the pulp moves along the system at a relatively uniform rate. This insures that the fibers will have a relatively thin distribution as they pass along the plates and each fiber will be subjected to a maximum amount of washing action. The quantity of pulp moved along the system is preferably maintained at such a level that each fiber will be individually subject to the washing action at all washing points.

Fibers of usable length necessarily become wrapped about the screens and a self-brushing system is employed to remove the pulp from the screens at the end of each belt. This takes the form of a cylindrical brush disposed on the inner side of the screen. The belt is rotated by the screen and its bristles pass through the screen so as to remove the particles that are pulled back through the screen so as to be cleaned.

Following the washing operation the pulp may be subjected to a conventional air dryer or be allowed to dry naturally.

It is therefore seen to be an object of the present invention to provide a washer for pulp comprising a series of elongated wire belts disposed end to end at successively lower levels and connected by inclined plates, wherein the pulp passes from belt to belt and is subjected to a pressured washing action as it passes over the inclined plates. A further object is to provide such a washing system wherein the elevations of the various elements and the speed of operation is such that the pulp will move along the system at a smooth rate so that each fiber is subjected to a maximum exposure to the washing action.

Other objects, advantages and applications of the present invention will be made apparent by the following detailed description of a preferred embodiment of the invention. The description makes reference to the accompanying drawings in which:

FIGURE 1 is a perspective view, partially broken away, of a washer embodying the principles of the present invention;

FIGURE 2 is a side view of one of the stages of the operation; and

FIGURE 3 is a cross-sectional view taken along lines 3—3 of FIGURE 2.

Referring to the drawing, the input to the washer is provided by a gravity chute 10. The slurry passing into the process from the chute is preferably the product of a beater operation which has waste paper as its raw material. The waste paper may be processed with water and a low sudsing detergent such as alkyl aryl sulphonate. The beater applies forces to the paper in the presence of the solution so as to physically and chemically separate the cellulose fibers from one another and the ink and foreign particles from the fibers. It does this by imposing forces in excess of the surface tension which holds the particles together. The output of the beater process is a suspension or slurry of the separated cellulose fibers, ink and foreign particles.

The washer may alternatively operate upon the slurry output of a similar beating process which has products such as rags as its raw material.

The suspension or slurry is preferably passed down the chute 10 at a continuous rate. The chute terminates at one end of an elongated closed wire mesh belt 12. In a typical operation the belt may be formed of 16 gage screen. The exact size of the screen employed in the belt is a function of the typical fiber length passed to the screen. With longer fibers a larger mesh may be employed.

The belts and the other mechanism of the washer are supported in a structure 13 which is shown broken away to disclose the full operation of the mechanism.

The belt 12 is supported on two pairs of rollers 14 and 16 which are respectively fixed on shafts 18 and 20. The shafts each have one of their ends journaled in wall supported bearings 21 and their other ends retained and journaled in bearing blocks 22 and 24.

An electric motor 26 powers the shaft 18 and thus the screen 12 through a pulley and belt system 28. In a preferred embodiment the motor 26 powers the belt 12 at about 150 inches per minute.

Inside the belt 12, adjacent the end thereof away from the chute, as may be seen in FIGURES 2 and 3, a nylon brush 30 is disposed below the shaft 20 and parallel thereto so that its bristles extend through the mesh of the belt. The brush 30 is journaled in mounts 32 which are supported below the bearings 22 and 24. The brush 30 is so positioned with respect to the belt 12 that its bristles extend through the mesh of the belt. The brush is thus rotated by the motion of the belt. As the bristles pass through the belt they push out the fibers that are lodged in the belt. As the belt continues to rotate the bristles withdraw and are thus cleaned by the mesh.

An inclined plate 34 is disposed adjacent to the lower end of the belt 12 adjacent to the brush 30. The plate 34 is inclined at an angle of approximately 20 degrees with respect to the horizontal and it has a width equal to that of the belt 12. It is supported by the structure 13. An elongated nozzle 36 is disposed above the plate 34 adjacent to the mid-section thereof. A branch water pipe 38 from the main pipe 40 supplies the nozzle 36 with water under pressure. The nozzle has holes extending along its entire length and directs a stream across the width of the plate 34.

The lower end of the plate 34 feeds onto a belt 42 which is identical to the belt 12. The wire mesh belt 42 is powered from the shaft 20 by means of a belt drive 44. The belt 42 is identical to the belt 12 in all respects and has a brush (not shown) disposed in the same manner as the brush 30.

The cellulose slurry indicated as 60 in FIGURE 2, proceeds off the end of the belt 42 onto a second inclined plate 46 where it is subjected to the action of another washer nozzle 48 that is also connected to the main 40. The output of the inclined plate 46 feeds onto a third screen belt 50 identical to the first two which again provides output to a third inclined plate 52. A third washer nozzle 54 directs a pressured flow at the now largely cleansed cellulose mass which passes down the plate 52. The final output stage is another wire mesh belt 56, longer than the preceding ones which may carry the remaining cellulose mass to a conventional air dryer or to other finishing stages.

As the cellulose mass passes over the belts 12, 42, 50 and 56, each of which may be of a length appropriate to the quantities and materials handled by the system and the speeds of the equipment, the liquid of the slurry tends to pass through the mesh and fall to some lower collecting point. The liquid tends to carry with it any particles which are of such size as to allow them to pass through the mesh and which are not attached to the cellulose fibers by superior forces or entrapped in various cavities of the fiber slurry.

As the slurry falls to one of the inclined plates 34, 46 or 52 it tends to move along that plate under the force of gravity. The inclination of the plates should therefore be adjusted to an angle which will provide a movement along the plates which is commensurate with the rate of travel of the belts so as to prevent the slurry from accumulating at spaced points on the belts.

The washing action which the slurry is subjected to from the nozzles 36, 48 and 54 first provides a mechanical beating action. The kinetic force of the water is expended against the fibers which ideally barely cover the surface of the inclined plates. This is in the nature of a beating action which tends to overcome the surface tension between the fibers and clinging ink particles. Secondly, water from the nozzles tends to mix with the soluble matter clinging to the fibers and to the aqueous solution surrounding the fibers and to dilute that material.

On the screens disposed intermediate of the plates the repeatedly diluted solution is removed.

The number of stages in the process is a function of the degree of cleaning required, the mass of material handled, and the flow rate of the material. The length of the screens and the inclined plates are functions of similar variables. In one instance belts 20 inches long moving at approximately 150 inches per minute were sufficient to obtain cellulose which was white under visual inspection from scrap news print when 20 pounds of slurry were processed over five minutes in a three stage operation.

Having thus described our invention, we claim:

1. Apparatus for washing cellulose pulp, comprising: a plurality of elongated horizontal screens disposed in a generally end to end relationship with succeeding screens occupying lower elevations in a staircase manner; means for moving said screens; a plurality of inclined imperforate plates connecting the contiguous ends of adjacent screens, said plates being so positioned that a mass removed from the terminal end of one screen will pass along a plate by gravity to the initial end of the adjacent lower screen; pressurized fluid means operative to direct a fluid flow across the width of such plates; and means for depositing a cellulose slurry at one end of the highest of said screens.

2. A washer for a slurry of cellulose fibers in a water and detergent base containing ink and other foreign particles, comprising: a plurality of elongated moving closed belts formed of a mesh material disposed in a generally end to end configuration with successive belts occupying successively lower elevations; inclined imperforate plates connecting adjacent belts; pressurized water means for spraying the surfaces of the inclined plates; and means for introducing the slurry to the outer end of the uppermost belt.

3. A washer for a slurry containing cellulose fibers, comprising: a plurality of elongated horizontal closed belts formed of a mesh material disposed in an end to end relation along an inclined line with successive belts occupying successively lower elevations; a plurality of inclined imperforate plates disposed between the adjacent ends of successive belts; water pressure means for spraying the surfaces of each of the inclined plates; brush means operative to disengage fibers disposed on a belt and to deposit the fibers on the adjacent inclined plate; and means for powering the belts so as to transfer the slurry material from the outer end of the upper-most belt across the belts and the plates to the outer end of the lower-most belt.

4. A washer for a slurry containing cellulose fibers, comprising: a plurality of elongated closed belts formed of a mesh material disposed with their upper surfaces lying in horizontal planes with successive belts occupying successively lower elevations; inclined imperforate plates disposed between the adjacent ends of successive belts so as to connect the end of an upper belt to the beginning of the successive lower belt; nozzles disposed in proximity to each of said plates; water pressure means connecting to each of the nozzles so as to spray the surfaces of each of the inclined plates; a brush disposed internally of each of said belts in proximity to the end thereof so that its bristles extend through the belt, said brushes being operative to disengage fibers disposed on said belts and to deposit the fibers on the adjacent inclined plate; and means for powering the belts so as to transfer the slurry material from the lower end of the upper-most belt across the belts and the plates to the outer end of the lower-most belt.

5. A washer for a slurry containing cellulose fibers, comprising: a series of horizontally disposed mesh belts arranged in end to end fashion with successive belts occupying successively lower elevations; inclined imperforate plates disposed between each pair of belts so as to connect the terminal end of one belt with the initial end of the next belt; pressurized fluid means operative to direct a fluid flow at each of said plates; and means for moving the belts so as to transfer the mass deposited on the outer edge of the highest belt successively across the belts and plates to the outer end of the lowest belt.

6. A washer for a slurry containing cellulose fibers, comprising: a series of elongated mesh sections disposed in horizontal planes and arranged in an end to end relationship with successive sections occupying lower elevations; inclined imperforate plates disposed between each pair of sections so as to connect an end of one section with the end of the successively lower section; means for moving each section in the direction of the successively lower section so as to transfer a mass disposed at the outer end of the upper section across the sections and the plates; brush means disposed at the end of each section and operative to remove a slurry contained on the section on to the adjacent inclined plate; and means for subjecting the inclined plates to a wash of pressurized fluid.

7. The washer of claim 6 wherein the brush means comprises a cylindrical brush rotatably disposed on a horizontal axis and having its bristles extending through the section so that the motion of the section causes the brush to rotate in such a manner that its fibers extend through and then retract from the mesh thereby ejecting fibers entrapped in such mesh.

References Cited in the file of this patent

UNITED STATES PATENTS

| | | |
|---|---|---|
| 475,246 | Morton | May 17, 1892 |
| 1,146,282 | Rogers | July 13, 1915 |
| 1,491,211 | Taylor | Apr. 22, 1924 |
| 1,527,369 | Meyer | Feb. 24, 1925 |